(12) United States Patent
Cho et al.

(10) Patent No.: US 11,626,594 B2
(45) Date of Patent: Apr. 11, 2023

(54) FLEXIBLE ELECTRODE, BIOFUEL CELL USING SAME, AND METHOD FOR MANUFACTURING SAME

(71) Applicant: Korea University Research and Business Foundation, Seoul (KR)

(72) Inventors: Jinhan Cho, Seoul (KR); Cheong Hoon Kwon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 601 days.

(21) Appl. No.: 16/763,031

(22) PCT Filed: Jul. 11, 2018

(86) PCT No.: PCT/KR2018/007846
§ 371 (c)(1),
(2) Date: Sep. 3, 2020

(87) PCT Pub. No.: WO2019/013544
PCT Pub. Date: Jan. 17, 2019

(65) Prior Publication Data
US 2021/0265637 A1 Aug. 26, 2021

(30) Foreign Application Priority Data
Jul. 14, 2017 (KR) .......................... 10-2017-0089803

(51) Int. Cl.
*H01M 4/86* (2006.01)
*H01M 4/88* (2006.01)
*H01M 4/90* (2006.01)
*H01M 4/92* (2006.01)
*H01M 8/16* (2006.01)

(52) U.S. Cl.
CPC ....... *H01M 4/8626* (2013.01); *H01M 4/8663* (2013.01); *H01M 4/8817* (2013.01);
(Continued)

(58) Field of Classification Search
CPC ............. H01M 4/8626; H01M 4/8663; H01M 4/8817; H01M 4/8828; H01M 4/8892;
(Continued)

(56) References Cited

U.S. PATENT DOCUMENTS

2007/0111289 A1 5/2007 Yang et al.
2011/0236769 A1* 9/2011 Xie ........................ B82Y 30/00
429/401

FOREIGN PATENT DOCUMENTS

JP 4839569 B2 12/2011
KR 2012-0040872 * 4/2012
(Continued)

OTHER PUBLICATIONS

Kumar et al., "Whole Blood Glucose Determination using Glucose Oxidase Immobilized on Cotton Cheese Cloth", Analytics Chimica Acta, vol. 338, 1997, pp. 135-140.*
(Continued)

*Primary Examiner* — Brittany L Raymond
(74) *Attorney, Agent, or Firm* — NSIP Law (57) ABSTRACT

The present invention relates to a flexible electrode, a biofuel cell using the same, and a method for manufacturing the same. The electrode according to the present invention comprises: a non-electrically conductive substrate (10); a base layer (20) disposed on the outer surface of the substrate (10); a nanoparticle layer (31) including metallic nanoparticles and disposed on the outer surface of the base layer (20); and a monomolecular layer (33) including a monomolecular material having an amine group and disposed on the outer surface of the nanoparticle layer (31).

14 Claims, 8 Drawing Sheets

(52) U.S. Cl.
CPC ....... *H01M 4/8828* (2013.01); *H01M 4/8892* (2013.01); *H01M 4/9041* (2013.01); *H01M 4/92* (2013.01); *H01M 8/16* (2013.01); *H01M 2004/8684* (2013.01)

(58) Field of Classification Search
CPC .... H01M 4/9041; H01M 4/92; H01M 4/9075; H01M 4/9008; H01M 4/8803; H01M 4/8657; H01M 4/8668; H01M 4/925; H01M 8/16; H01M 2004/8689; H01M 2004/8684; Y02E 60/50; Y02P 70/50
See application file for complete search history.

(56) References Cited

FOREIGN PATENT DOCUMENTS

| | | | |
|---|---|---|---|
| KR | 10-2012-0113085 A | | 10/2012 |
| KR | 10-2017-0001579 A | | 1/2017 |
| WO | WO 2007/088975 A1 | | 8/2007 |
| WO | WO 2012-122404 | * | 9/2012 |

OTHER PUBLICATIONS

English translation of KR Publication 2012-0040872, Apr. 2012.*
International Search Report dated Nov. 1, 2018 in corresponding International Patent Application No. PCT/KR2018/007846 (2 pages in English, 2 pages in Korean).
Kumar et al., "Whole blood glucose determination using glucose oxidase immobilized on cotton cheese cloth," Analytica Chimica Acta, 1997. vol. 338, pp. 135-140.

* cited by examiner

FLEXIBLE ELECTRODE, BIOFUEL CELL USING SAME, AND METHOD FOR MANUFACTURING SAME

CROSS-REFERENCE TO RELATED APPLICATIONS

This application is a U.S. National Stage Application of International Application No. PCT/KR2018/007846, filed on Jul. 11, 2018, which claims the benefit under 35 USC 119(a) and 365(b) of Korean Patent Application No. 10-2017-0089803, filed on Jul. 14, 2017, in the Korean Intellectual Property Office, the entire disclosure of which is incorporated herein by reference.

TECHNICAL FIELD

The present invention relates to a flexible electrode, a biofuel cell using the flexible electrode, a method for manufacturing the flexible electrode, and a method for fabricating the biofuel cell. More specifically, the present invention relates to a technology in which an electrically non-conductive material is imparted with conductivity by coating with metal nanoparticles and is applied to a biofuel cell.

The present invention was made with the support of the Korean Ministry of Education, under Project No. 2017003192, which was conducted in the research project "Development of highly conductive nanocomposites based on metal nanoparticles and fibrous hybrid energy systems" within the project "Fostering Next-generation Researchers in Science and Engineering_Presidential Post-doctoral Fellowship" and with the support of the Korean Ministry of Science, ICT & Future Planning, under Project No. 201805019452, which was conducted in the research project "Development of high performance nanocomposite electrode platforms based on polymer fabric materials and elastomers and their application to energy storage/generation systems" within the project "Promotion (Follow-up) of Mid-career Researchers in Science and Engineering".

BACKGROUND ART

A biofuel cell (BFC) is a type of fuel cell that uses a biomaterial as a fuel or utilizes a biocatalyst to oxidize a fuel. Biofuel cells have received attention mainly as power sources for implantable biomedical devices such as cardiac pacemakers, nerve stimulators, and drug delivery pumps. However, biofuel cells developed hitherto have the disadvantages of low power, short operation time, and poor mechanical properties. Since the performance of a biofuel cell is determined by the transfer of electrons from an enzyme to an electrode, the surface structure of the electrode is of particular importance. The surface structure of the electrode should have high active surface area while possessing high conductivity such that an electric current can flow efficiently through the electrode.

Conventional biofuel cells use carbon nanotubes as electrode host materials. However, carbon nanotubes are very expensive and are not readily available, limiting their application to biofuel cells.

Thus, there is a strong need to develop host electrodes for biofuel cells that can replace carbon nanotubes.

DETAILED DESCRIPTION OF THE INVENTION

Problems to be Solved by the Invention

The present invention has been made in an effort to solve the problems of the prior art and one aspect of the present invention is to provide an electrode with controllable conductivity that is manufactured by coating metal nanoparticles on a cheap and readily available electrically non-conductive substrate based on layer-by-layer self-assembly, and a biofuel cell with improved power generation efficiency that is fabricated by applying the electrode to a cathode and an anode.

Particularly, the present invention provides a fibrous electrode in which a large amount of metal nanoparticles is coated on the surface of a cotton fiber as an electrically non-conductive substrate due to the hydrophilicity of the cotton fiber and the cotton fibrils are structurally twisted to form pores as passages for electron and mass transfer.

Means for Solving the Problems

An electrode of the present invention includes an electrically non-conductive substrate, a base layer disposed on the outer surface of the substrate, a nanoparticle layer including metal nanoparticles and disposed on the outer surface of the base layer, and a monomolecular layer including a monomolecular material having one or more amine groups and disposed on the outer surface of the nanoparticle layer.

The substrate is a cotton fiber.

The base layer is composed of polyethylenimine (PEI).

The metal nanoparticles are nanoparticles of at least one metal selected from the group consisting of gold, silver, aluminum, copper, and platinum.

The monomolecular material is tris(2-aminoehylamine) (TREN).

The electrode includes a plurality of nanocomposite thin films, each of which has a bilayer structure in which the monomolecular layer is formed on the nanoparticle layer.

A biofuel cell of the present invention includes: an anode including an electrode, an enzyme layer including an enzyme and disposed on the outer surface of a monomolecular layer of the electrode, and a linker layer including a monomolecular material having one or more amine groups and disposed on the outer surface of the enzyme layer; and a cathode including an electrode.

The enzyme is selected from the group consisting of glucose oxidase, D-fructose dehydrogenase, and a mixture thereof.

The monomolecular material is tris(2-aminoehylamine) (TREN).

The biofuel cell includes a plurality of oxidation layers, each of which has a bilayer structure in which the linker layer is formed on the enzyme layer.

A method for manufacturing an electrode according to the present invention includes (a) dipping an electrically non-conductive substrate in a solution of a polymer to form a base layer, (b) dipping the substrate, where the base layer is formed, in a solution of metal nanoparticles to form a nanoparticle layer, and (c) dipping the substrate, where the nanoparticle layer is formed, in a solution of a monomolecular material having one or more amine groups to form a monomolecular layer wherein a nanocomposite thin film having a bilayer structure consisting of the nanoparticle layer and the monomolecular layer is formed on the outer surface of the substrate.

Steps (b) and (c) are repeated sequentially such that a plurality of nanocomposite thin films are formed.

A method for fabricating a biofuel cell according to the present invention includes (a) dipping two electrically non-conductive substrates in a solution of a polymer to form base layers, (b) dipping the substrates, where the base layers are formed, in a solution of metal nanoparticles to form nanoparticle layers, (c) dipping the substrates, where the nanoparticle layers are formed, in a solution of a monomolecular material having one or more amine groups to form monomolecular layers, (d) dipping one of the substrates, where the monomolecular layers are formed, in a solution of an enzyme to form an enzyme layer, and (e) dipping the substrate, where the enzyme layer is formed, in a solution of a monomolecular material having one or more amine groups to form a linker layer.

Steps (a) and (b) are repeated sequentially such that a plurality of nanocomposite thin films are formed on the base layer and each of the nanocomposite thin films has a bilayer structure in which the monomolecular layer is formed on the nanoparticle layer; and steps (c) and (d) are repeated sequentially such that a plurality of oxidation layers are formed and each of the oxidation layers has a bilayer structure in which the linker layer is formed on the enzyme layer.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

Effects of the Invention

The electrode of the present invention includes an electrically non-conductive material imparted with conductivity and can be manufactured in a relatively economical and easy manner compared to conventional electrodes using carbon nanotubes as electrode host materials.

In addition, the conductivity of the electrode according to the present invention can be easily controlled by varying the amount of metal nanoparticles coated on a cotton fiber. The electrode of the present invention can be applied to flexible devices due to its sufficient electrochemical performance and high flexibility. The electrode of the present invention uses a cotton fiber and metal nanoparticles whose biocompatibility and biostability are demonstrated, thus being applicable to next-generation implantable systems.

Furthermore, the biofuel cell of the present invention based on the cotton fiber electrode contains a large amount of metal nanoparticles coated per unit area due to the hydrophilicity of the cotton fiber. Moreover, fuels and electrons are easily transferred to an anode and a cathode of the biofuel cell through micropores of the cotton fiber, resulting in an improvement in the power generation efficiency of the biofuel cell.

BEST MODE FOR CARRYING OUT THE INVENTION

Other objects, advantages, and novel features of the invention will become more apparent from the following detailed description and preferred embodiments with reference to the accompanying drawings. In the drawings, the same elements are denoted by the same reference numerals even though they are depicted in different drawings. Although such terms as "first" and "second," etc. may be used to describe various elements, these elements should not be limited by above terms. These terms are used only to distinguish one element from another. In the description of the present invention, detailed explanations of related art are omitted when it is deemed that they may unnecessarily obscure the essence of the present invention.

Preferred embodiments of the present invention will now be described with reference to the accompanying drawings.

Figure 1:
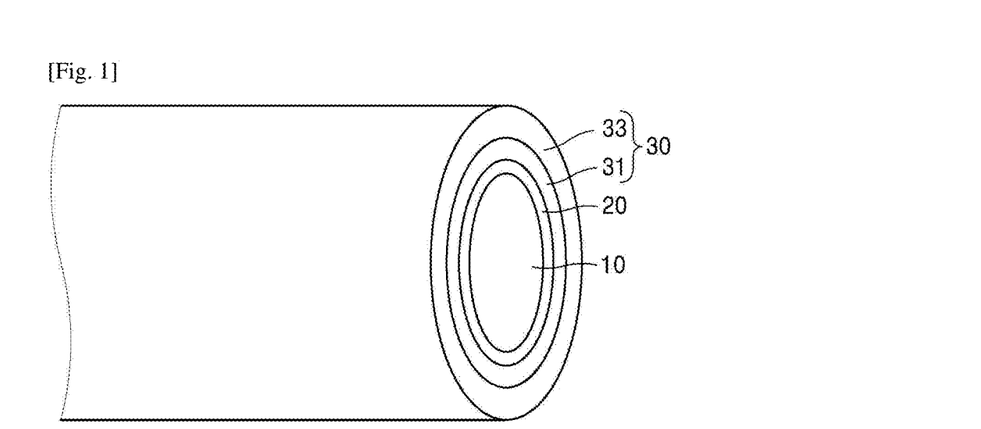
FIG. 1 is a partial perspective view of an electrode according to one embodiment of the present invention.
Figure 2:
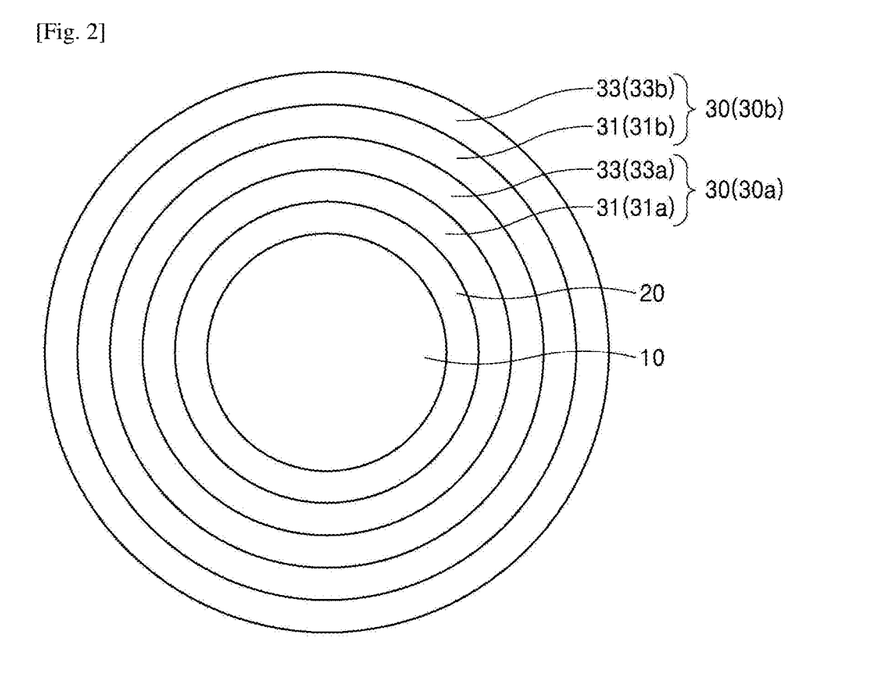
FIG. 2 is a cross-sectional view of an electrode according to a further embodiment of the present invention.

FIG. 1 is a partial perspective view of an electrode according to one embodiment of the present invention and FIG. 2 is a cross-sectional view of an electrode according to a further embodiment of the present invention.

As illustrated in FIGS. 1 and 2, the electrode of the present invention includes an electrically non-conductive substrate 10, a base layer 20 disposed on the outer surface of the substrate 10, a nanoparticle layer 31 including metal nanoparticles and disposed on the outer surface of the base layer 20, and a monomolecular layer 33 including a monomolecular material having one or more amine groups and disposed on the outer surface of the nanoparticle layer 31.

The present invention is directed to an electrode that includes an electrically non-conductive material imparted with conductivity by coating with metal nanoparticles and can be applied to biofuel cells and biosensors. Biofuel cells are devices that convert biological energy into electrical energy. Conventional biofuel cells use highly electrically conductive carbon nanotubes as electrode host materials. However, carbon nanotubes are not readily available and are expensive, limiting their application. The electrode of the present invention has the potential to replace conventional electrodes based on carbon nanotubes. However, the electrode of the present invention is not necessarily limited to specific applications such as biofuel cells and is applicable to any electronic device where electron transfer is needed.

As described above, the electrode of the present invention includes an electrically non-conductive substrate 10, a base layer 20, a nanoparticle layer 31, and a monomolecular layer 33.

The substrate 10 per se is not electrically conductive and its type and shape are not especially limited to those illustrated in FIGS. 1 and 2. However, the substrate 10 is composed of a cotton fiber that can improve the flexibility and electron transfer capability of the electrode, which will be described later. The base layer 20 is disposed on the outer surface of the substrate 10.

The base layer 20 is formed by coating and partially or entirely surrounds the outer surface of the substrate 10. The formation of the base layer 20 allows for effective coating of the nanoparticle layer 31 on the substrate 10. For example, the base layer 20 may be formed by coating polyethylenimine (PEI) on the substrate 10. However, the material for the base layer 20 is not necessarily limited to polyethylenimine (PEI). Any material that enables the formation of the nanoparticle layer 31 on the substrate 10 by coating may be used to form the base layer 20.

The nanoparticle layer 31 is introduced on the outer surface of the substrate 10 via the base layer 20. The nanoparticle layer 31 may partially or entirely surround the outer surface of the base layer 20. The nanoparticle layer 31 may be formed by layer-by-layer (LbL) self-assembly based on a solution process. The nanoparticle layer 31 includes metal nanoparticles to impart electrical conductivity to the electrically non-conductive substrate 10. The metal nanoparticles may be nanoparticles of at least one metal selected from the group consisting of gold, silver, aluminum, copper, and platinum but the metal of the metal nanoparticles is not necessarily limited to the above-mentioned type. Any metal that can impart electrical conductivity to the electrically non-conductive substrate may be used in the present invention. The monomolecular layer 33 is disposed on the outer surface of the nanoparticle layer 31.

The monomolecular layer 33 is composed of a monomolecular material having one or more amine groups and is formed by coating the monomolecular material so as to partially or entirely surround the outer surface of the nanoparticle layer 31. The monomolecular material may be coated on the nanoparticle layer 31 by layer-by-layer (LbL) self-assembly based on a solution process. Metals have low resistance whereas films composed of metal particles exhibit insulating properties when the metal particles are surrounded by long organic ligands. Thus, the amine group-containing monomolecular material substituted with insulating ligands is used in the present invention to improve the bonding strength between the metal nanoparticles and to improve the electrical conductivity of the nanoparticle layer 31. The amine group-containing monomolecular material fixing the metal nanoparticles and improving the electrical conductivity of the nanoparticle layer 31 may be, for example, tris(2-aminoethyl)amine (TREN) or diethylenetriamine (DETA) but is not necessarily limited thereto. Any material that can impart electrical conductivity to the nanoparticle layer 31 may be used as the monomolecular material.

To sum up, the electrically non-conductive substrate 10 is imparted with electrical conductivity by a nanocomposite thin film 30 having a bilayer structure consisting of the nanoparticle layer 31 and the monomolecular layer 33 formed by layer-by-layer self-assembly.

According to a further embodiment of the present invention, the electrode includes a plurality of nanocomposite thin films stacked on one another (see FIG. 2). For example, the electrode may include a first nanocomposite thin film 30a in which a monomolecular layer 33a is formed on a nanoparticle layer 31a and a second nanocomposite thin film 30b in which a monomolecular layer 33b is formed on a nanoparticle layer 31b. The second nanocomposite thin film 30b is disposed on the first nanocomposite thin film 30a. As the number of the nanocomposite thin films increases, the electrical conductivity of the electrode increases. Accordingly, the number of the nanocomposite thin films 30a can be determined by the required electrical conductivity of a device using the electrode of the present invention.

A cotton fiber can be used as the electrically non-conductive substrate 10. The use of the cotton fiber enables the application of the electrode to flexible devices, the coating of a larger amount of the metal nanoparticles, and the application of the electrode to an anode and a cathode for a biofuel cell, resulting in improved power generation efficiency.

Figure 3:
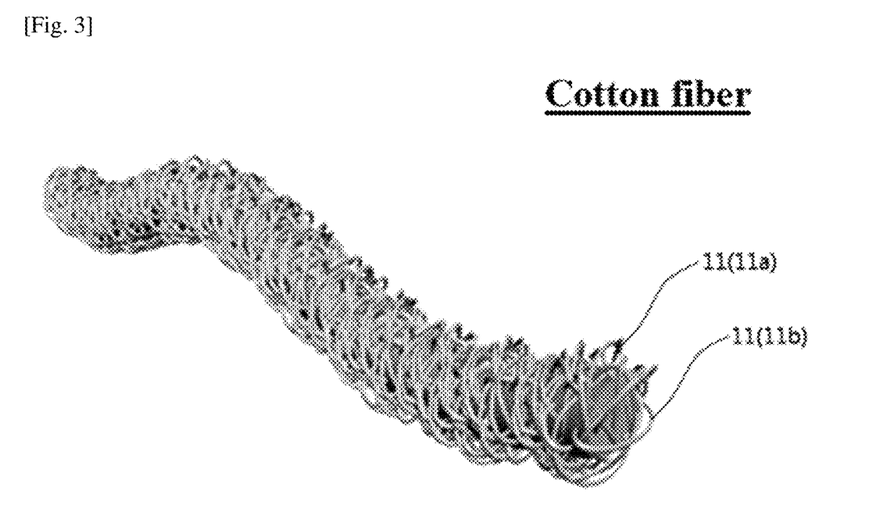
FIG. 3 is an enlarged view of a cotton fiber.

FIG. 3 is an enlarged view of a cotton fiber.

As illustrated in FIG. 3, the cotton fiber is a short single fiber having a structure in which a plurality of thin fibrils 11 are coiled and overlap with one another. The plurality of fibrils 11a and 11b are densely entangled to form micropores having a size of several tens of microns in the cotton fiber. Due to its structure, the cotton fiber is hydrophilic. According to a solution process, the cotton fiber dipped in a dispersion of metal nanoparticles is coated with a large amount of the nanoparticles. That is, the absolute amount of the metal nanoparticles per unit area of the electrode increases, resulting in effective electron transfer in the electrode. This makes the electrode suitable for use in a biofuel cell. The internal pores of the cotton fiber serve as passages for electron and mass transfer, facilitating the delivery of fuels and electrons to an anode and a cathode for a biofuel cell. Consequently, an anode and a cathode for a biofuel cell based on the cotton fiber electrode of the present invention have an outstanding ability to produce an electric current in response to changes in potential, resulting in a significant increase in current signal upon reaction with the anode fuel.

However, the non-conductive substrate 10 is not necessarily limited to a cotton fiber and can be selected from various types and shapes of non-conductive materials, including fiber-type non-conductive materials and disc-shaped non-conductive materials.

A detailed description will be given concerning the structure of a biofuel cell using the electrode of the present invention.

Figure 4:
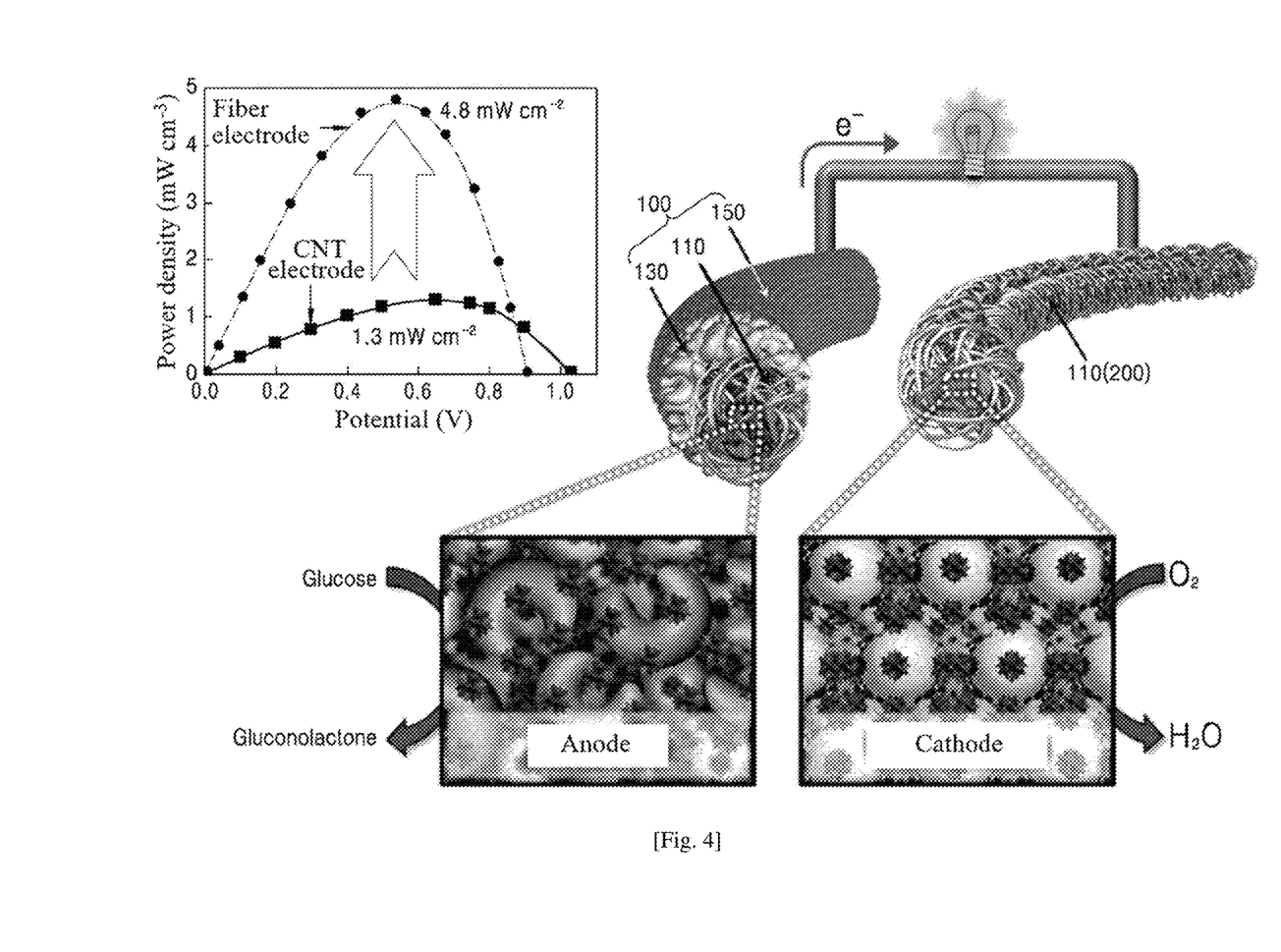
FIG. 4 is a schematic view of a biofuel cell according to one embodiment of the present invention.

FIG. 4 is a schematic view of a biofuel cell according to one embodiment of the present invention.

As illustrated in FIG. 4, the biofuel cell includes: an anode 100 including an electrode 110, an enzyme layer 130 including an enzyme and disposed on the outer surface of a monomolecular layer of the electrode 110, and a linker layer 150 including a monomolecular material having one or more amine groups and disposed on the outer surface of the enzyme layer 130; and a cathode 200 including an electrode 110.

A biofuel cell includes an anode at which a hydrogen produced from the oxidation of glucose is used as a fuel and a cathode at which electron transfer is induced by the reduction of oxygen to generate electricity. Representative examples of such biofuel cells include enzymatic biofuel cells in which glucose oxidase is directly immobilized on an electrode and microbial biofuel cells in which a microorganism having a good ability to oxidize glucose is used as a catalyst. The biofuel cell of the present invention may be an enzymatic biofuel cell. In this case, the performance of the enzymatic biofuel cell can be improved by increasing the amount of the enzyme attached to the electrode 110, increasing the active surface area of the electrode 110 using nanostructures or facilitating the transfer of electrons at the electrode 110.

Conventional enzymatic biofuel cells use redox electron carriers to efficiently deliver electrons generated by an enzymatic reaction to an electrode. The redox electron carriers contain non-biocompatible metal materials such as osmium, thus being unsuitable for in vivo applications. The unsafety of the electron carriers deteriorates the stability of the biofuel cells, leading to a short operation time of the biofuel cells. As a solution to the problems of conventional enzymatic biofuel cells, the biofuel cell of the present invention uses an electrode 110, in which metal nanoparticles are coated on an electrically non-conductive substrate, particularly a cotton fiber electrode.

As described above, the anode 100 of the biofuel cell according to the present invention includes an electrode 110, an enzyme layer 130, and a linker layer 150. The electrode 110 is the same as that described above.

The electrode 110 is particularly a cotton fiber electrode in which a plurality of nanocomposite thin films are stacked on one another. The other layers are the same as those described above and a repeated description thereof is omitted or only briefly presented herein.

The enzyme layer 130 includes an enzyme and is formed on the outer surface of the outermost monomolecular layer. The enzyme layer 130 may be formed by coating an enzyme so as to surround the monomolecular layer. The enzyme may be coated on the monomolecular layer by a solution process. For example, the enzyme may be selected from the group consisting of glucose oxidase (GOx), D-fructose dehydrogenase, and a mixture thereof but is not necessarily limited thereto. Any enzyme that can react with glucose as a fuel for the anode 100 to oxidize hydrogen may be used in the present invention.

The linker layer 150 includes a monomolecular material having one or more amine groups and is disposed on the outer surface of the enzyme layer 130. The linker layer 150 may be formed partially or entirely surrounding the outer surface of the enzyme layer 130. The monomolecular material for the linker layer 150 may be, for example, tris(2-aminoethyl)amine (TREN) or diethylenetriamine (DETA). The linker layer 150 may be formed on the enzyme layer 130 by dipping the enzyme layer 130 in a solution of the monomolecular material.

The enzyme layer 130 and the linker layer 150 formed on the enzyme layer 130 form an oxidation layer having a bilayer structure. The oxidation layer may be provided in plurality. In this case, the biofuel cell may include a first oxidation layer in which a linker layer 150 is formed on an enzyme layer 130 and a second oxidation layer which another linker layer 150 is formed on another enzyme layer 130. The second oxidation layer is disposed on the first oxidation layer.

The cathode 200 of the biofuel cell may use an electrode 110 including a substrate coated with metal nanoparticles without enzyme introduction. The electrode 110 is particularly a cotton fiber electrode in which a plurality of nanocomposite thin films are stacked on one another.

The mode of operation of the biofuel cell based on the cotton fiber electrode 110 is discussed below. When assuming that glucose is used as a fuel for the anode 100 and GOx is used for the enzyme layer 130, the glucose is oxidized to gluconolactone at the anode 100 and electrons migrate from the GOx to the cotton fiber electrode 110. Electrons are transferred from the cotton fiber electrode 110 through an electrolyte by a reduction reaction at the cathode 200. The reduction reaction can be caused in the presence of oxygen by the introduction of gold nanoparticles, eliminating the need to use an expensive cathode catalyst.

There is a high possibility that the cotton fiber electrode 110 can be applied to subminiature platforms for energy production and devices for energy storage, ensuring its wide application to a variety of electrical/electronic devices and biomedical devices.

MODE FOR CARRYING OUT THE INVENTION

A method for manufacturing an electrode and a method for fabricating a biofuel cell according to the present invention are described below.

Figure 5:
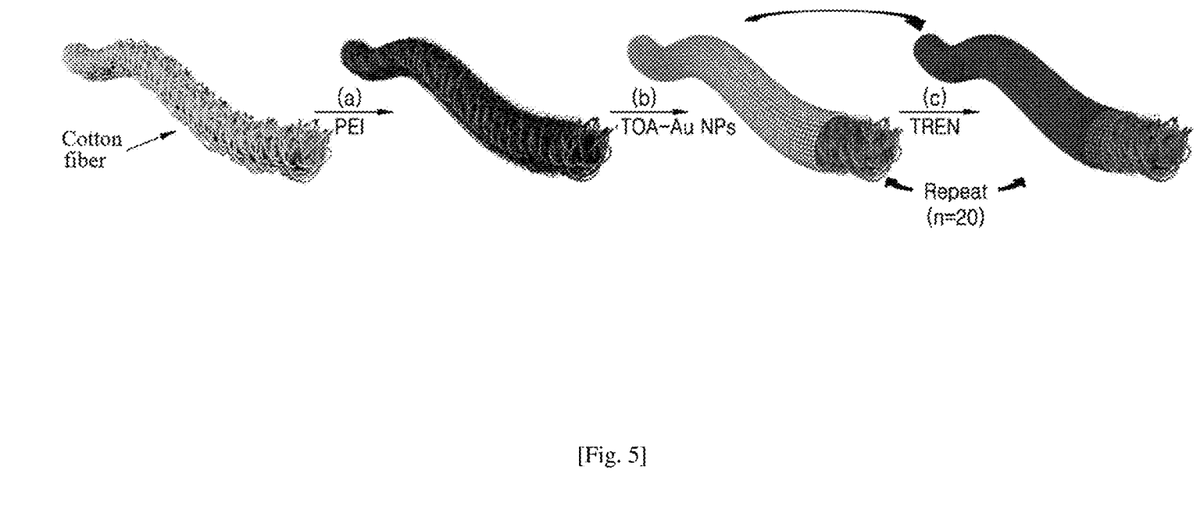
FIG. 5 is a process flow diagram illustrating a method for manufacturing an electrode according to one embodiment of the present invention.

FIG. 5 is a process flow diagram illustrating a method for manufacturing an electrode according to one embodiment of the present invention.

As illustrated in FIG. 5, the method includes (a) dipping an electrically non-conductive substrate in a solution of a polymer to form a base layer, (b) dipping the substrate, where the base layer is formed, in a solution of metal nanoparticles to form a nanoparticle layer, and (c) dipping the substrate, where the nanoparticle layer is formed, in a solution of a monomolecular material having one or more amine groups to form a monomolecular layer wherein a nanocomposite thin film having a bilayer structure consisting of the nanoparticle layer and the monomolecular layer is formed on the outer surface of the substrate.

An electrode manufactured by the method of the present invention is the same as that described above and a repeated description thereof is omitted or only briefly presented herein.

According to the method of the present invention, an electrode is manufactured by layer-by-layer self-assembly based on a solution.

First, an electrically non-conductive substrate is dipped in a solution of a polymer to form a base layer (step (a)). The polymer may be polyethylenimine (PEI). In this case, polyethylenimine (PEI) is dissolved in a solvent such as ethanol. However, there is no particular restriction on the kinds of the polymer and the solvent. The substrate may be a cotton fiber, as illustrated in FIG. 5, but is not necessarily limited thereto.

Next, the substrate, where the base layer is formed, is dipped in a solution of metal nanoparticles (step (b)). The metal nanoparticles are layer-by-layer self-assembled to form a nanoparticle layer in the form of a film on the outer surface of the base layer. The metal nanoparticles are gold nanoparticles protected with tetraoctylammonium bromide (TOABr) but are not necessarily limited thereto. For example, the metal nanoparticle may be nanoparticles of at least one metal selected from the group consisting of silver, aluminum, copper, and platinum. The method may further include washing away uncoated metal nanoparticles with a suitable solvent such as pure toluene.

The substrate, where the nanoparticle layer is formed, is dipped in a solution of a monomolecular material having one or more amine groups (step (c)). The monomolecular material is layer-by-layer self-assembled on the nanoparticle layer to form a monomolecular layer. The nanoparticle layer and the monomolecular layer form a nanocomposite thin film having a bilayer structure. Weakly adsorbed molecules of the monomolecular material may be washed away with a suitable solvent such as ethanol. The substrate, where the nanocomposite thin film is formed, is dried, completing the manufacture of an electrode in which one nanocomposite thin film is formed. The monomolecular material is tris(2-aminoethyl)amine (TREN) that causes ligand exchange between TREN and TOABr. However, the monomolecular material is not necessarily limited to TREN and any monomolecular material having amine groups, such as diethylenetriamine (DETA), may be used without limitation.

The nanocomposite thin film may be provided in plurality. To this end, steps (b) and (c) are repeated sequentially. The method may further include washing and drying before each of the dipping steps.

A method for fabricating a biofuel cell according to the present invention includes (a) dipping two electrically non-conductive substrates in a solution of a polymer to form base layers, (b) dipping the substrates, where the base layers are formed, in a solution of metal nanoparticles to form nanoparticle layers, (c) dipping the substrates, where the nanoparticle layers are formed, in a solution of a monomolecular material having one or more amine groups to form monomolecular layers, (d) dipping one of the substrates, where the monomolecular layers are formed, in a solution of an enzyme to form an enzyme layer, and (e) dipping the substrate, where the enzyme layer is formed, in a solution of a monomolecular material having one or more amine groups to form a linker layer.

A biofuel cell fabricated by the method of the present invention includes an anode and a cathode. According to the method of the present invention, the anode and the cathode are produced using two electrically non-conductive substrates. Since the electrode of the present invention per se is used as the cathode, an enzyme layer is not present in the cathode. The cathode is produced by the method for manufacturing the electrode (including steps (a)-(c)).

On the other hand, the anode is produced by the following procedure. First, a substrate, where a nanocomposite thin film is formed, is prepared through steps (a)-(c) and dipped in a solution of an enzyme to form an enzyme layer on the outermost monomolecular layer of the nanocomposite thin film. The solvent may be phosphate buffer (PB buffer) but is not necessarily limited thereto. The enzyme can be selected from the group consisting of glucose oxidase, D-fructose dehydrogenase, and a mixture thereof.

Next, the substrate, where the enzyme layer is formed, is dipped in a solution of a monomolecular material to form a linker layer on the enzyme layer. The enzyme layer and the linker layer formed on the enzyme layer form an oxidation layer having a bilayer structure. The monomolecular material may be, for example, tris(2-aminoethyl) amine (TREN) or diethylenetriamine (DETA) and the solvent may be phosphate buffer (PB buffer).

The anode of the biofuel cell according to the present invention may have a structure in which a plurality of oxidation layers are formed. To this end, steps (d) and (e) are repeated sequentially.

The present invention will be explained in more detail with reference to the following examples.

Example 1: Synthesis of TOA-Gold Nanoparticles

In this example, gold nanoparticles protected with tetraoctylammonium bromide (TOABr) were synthesized. First, a 30 mM solution of $HAuCl_4 \cdot 3H_2O$ in deionized water (30 ml) was mixed with a 20 mM dispersion of TOABr in toluene (80 ml) with stirring and a 0.4 M aqueous solution of $NaBH_4$ (25 ml) was added thereto to reduce the $HAuCl_4 \cdot 3H_2O$. The toluene was separated from the aqueous solution, followed by washing several times with $H_2SO_4$ (0.1 M, purity 95%), NaOH (0.1 M, 97%), and deionized water to afford 8-nm-diameter TOA-gold nanoparticles.

Example 2: Manufacture of Cotton Fiber Electrodes

In this example, cotton fiber electrodes were manufactured. First, a cotton fiber was dipped in a solution of polyethylenimine (PEI) in ethanol (1 mg ml$^{-1}$). Then, the PEI-coated cotton fiber was dipped in a solution (10 mg ml$^{-1}$) of the TOA-gold nanoparticles synthesized in Example 1 for 40 min, washed with pure ethanol, dipped in an ethanolic dispersion of TREN (1 mg ml$^{-1}$) for 40 min, and washed with pure toluene to remove weakly adsorbed TREN molecules to afford a fiber electrode in which one bilayer nanocomposite thin film was formed (hereinafter referred to as "(TOA-Au/TREN)$_1$ fiber electrode"). Here, ligand exchange occurred between TOABr and TREN.

The above procedure was repeated several times to manufacture cotton fiber electrodes in which different numbers of nanocomposite thin films were stacked on one another.

Example 3: Production of Anodes and Cathodes for Biofuel Cells

In this example, anodes and cathodes for biofuel cells were produced. First, the cotton fiber electrode manufactured in Example 2 was dipped in a solution (GOx, 5 mg ml$^{-1}$) of glucose oxidase (GOx) in phosphate buffer (PB buffer). Next, the (TOA-Au/TREN)$_{20}$ cotton fiber electrode including twenty nanocomposite thin films stacked on one another, which was manufactured in Example 2, was dipped in a solution of TREN in PB to afford a fiber anode ((TOA-Au/TREN)$_{20}$(GOx/TREN)$_1$) in which one enzyme bilayer was formed. The above procedure was repeated to produce fiber anodes in which different numbers of enzyme bilayers were stacked on one another. The (TOA-Au/TREN)$_{20}$ cotton fiber electrode was used without further processing as a cathode.

Figure 6:
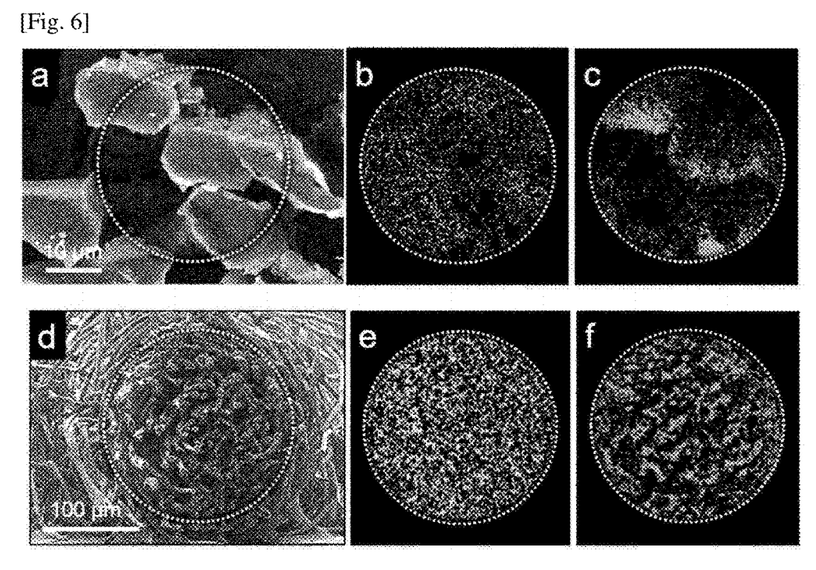
FIG. 6 shows cross-sectional SEM and EDAX images of a cotton fiber electrode manufactured in Example 2.

Evaluation Example 1: SEM Imaging and EDAX of the Cotton Fiber Electrode FIG. 6 shows cross-sectional SEM and EDAX images of the fiber/(TOA-Au/TREN)$_{20}$) cotton fiber electrode manufactured in Example 2. In FIG. 6, (a) and (d) are scanning electron images of the cotton fiber electrode and (b), (c), (e), and (f) shows the results of EDAX for the cotton fiber electrode (yellow: gold nanoparticles, red: carbon). In FIG. 6, (a), (b), and (c) are high magnification images of the cotton fiber electrode and (d), (e), and (f) are low magnification images of the cotton fiber electrode. The SEM images reveal an internal structure of the cotton fiber in which pores serving were formed between the fibrils in the form of thin threads densely coated with the gold nanoparticles to provide passages, demonstrating a difference in the overall structure of the electrode. The EDAX images reveal that mass transfer and diffusion of fuels (e.g., glucose and oxygen) can be promoted through the pores serving as passages.

Evaluation Example 2: Electrical Conductivities of the Cotton Fiber Electrodes

Figure 7:
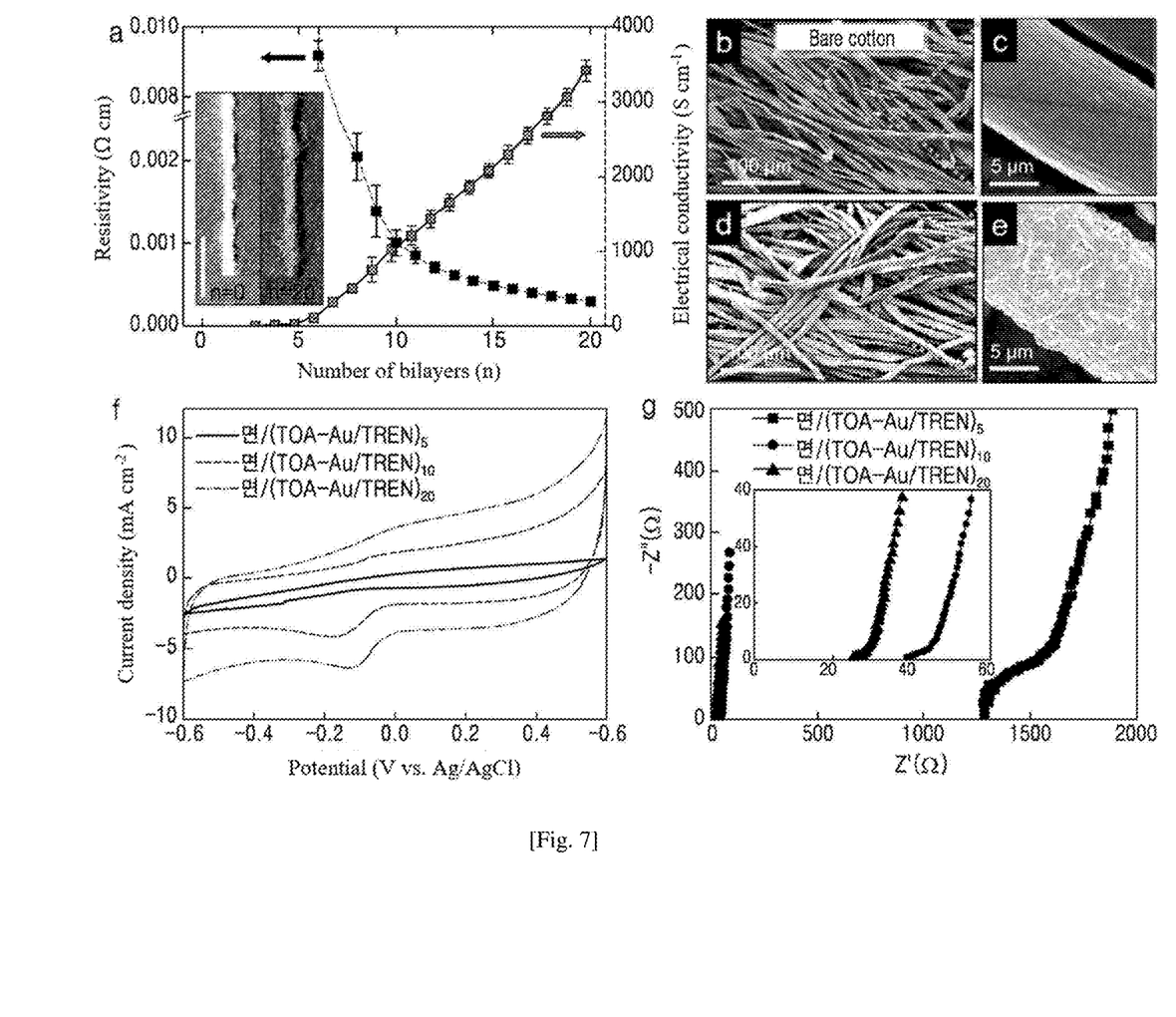
FIG. 7 shows the electrical conductivities, SEM images, CV curves, and impedance spectra of cotton fiber electrodes manufactured in Example 2 as a function of the number of nanocomposite thin films.

FIG. 7 shows electrical conductivities, (b)-(e) SEM images, (f) CV curves, and (g) impedance spectra of the cotton fiber electrodes (fiber/(TOA-Au/TREN)$_n$) as a function of the number of nanocomposite thin films (n).

As shown in (a) of FIG. 7, as the number of the TOA-Au and TREN bilayers (i.e. the nanocomposite thin films) increased, the electrical conductivity of the cotton fiber electrode increased and the resistivity of the cotton fiber electrode decreased. This is because the electrically non-conductive cotton fiber was imparted with conductivity by coating with the gold nanoparticles.

In FIG. 7, (b) and (c) are SEM images of the bare cotton fiber and (d) and (e) are SEM images of the coated cotton fiber. The SEM images reveal that the gold nanoparticles were densely and uniformly coated on the fibrils of the cotton fiber.

The current density of the cotton fiber electrode had a dependence on potential with increasing number of the TOA-Au/TREN bilayers in the cotton fiber electrode bound with the gold nanoparticles (see (f) of FIG. 7). ESR decreased with increasing number of the TOA-Au/TREN bilayers (see (g) of FIG. 7). ESR is caused by equivalent distribution resistance associated with ion diffusion in the nanostructured electrode. When the number of the TOA-Au/TREN bilayers was increased from 5 to 20, the resistance was changed to 1,346Ω (n=5), 40Ω (n=10), and 25Ω (n=20). The sum of internal resistances was electrochemically obtained by impedance tests. The low resistance value indicates effective electron transfer.

Evaluation Example 3: Performance of Anode and Cathode for Biofuel Cell

Figure 8:
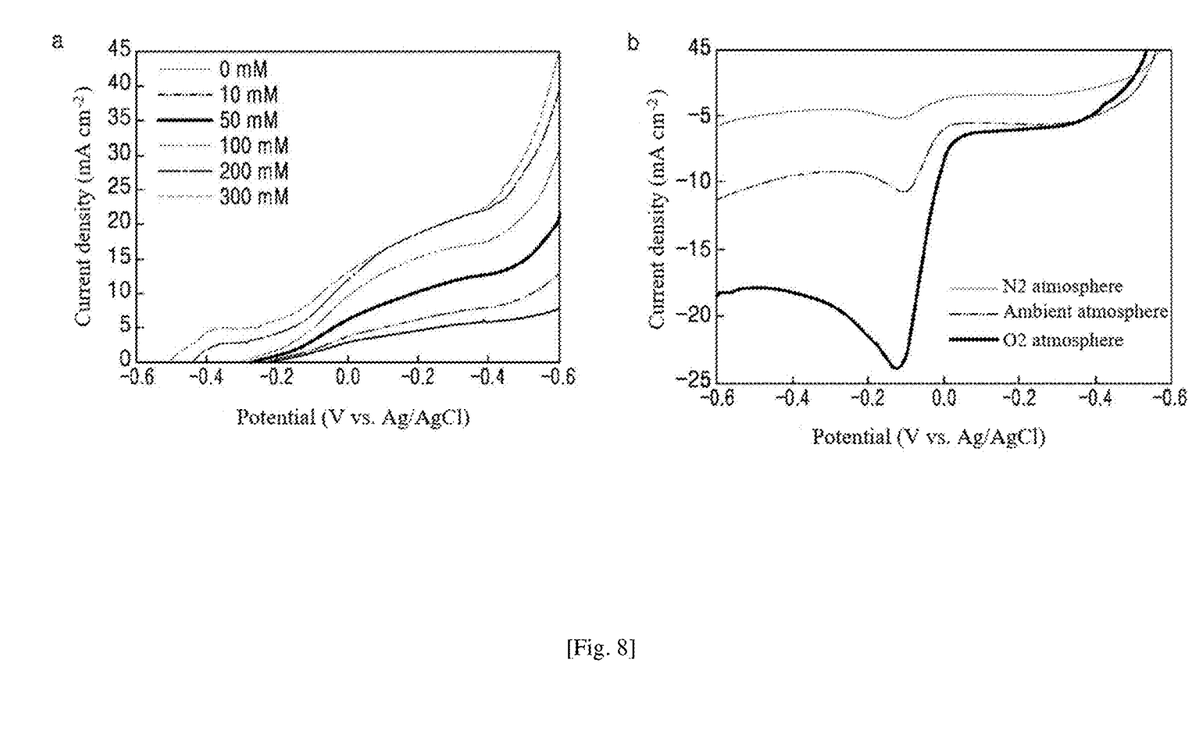
FIG. 8 shows the polarization curves of electrodes for a biofuel cell produced in Example 3.

Five oxidation layers ((GOx/TREN)$_5$) were formed on the cotton fiber electrode bound with the metal nanoparticles to produce an anode for a biofuel cell. The cotton fiber electrode was used without further processing as a cathode. The performance of each of the anode and the cathode was evaluated. In FIG. 8, (a) shows the polarization curves of the anode when the concentration of glucose was increased from 0 to 300 mmol l$^{-1}$ and (b) shows the polarization curves of the cathode under different atmospheres.

Referring to FIG. 8, the anode and the cathode based on the cotton fiber electrode had an outstanding ability to produce an electric current in response to changes in potential, resulting in a significant increase in current signal upon reaction with glucose.

Evaluation Example 4: Power Generation Efficiency of the Biofuel Cell

Figure 9:
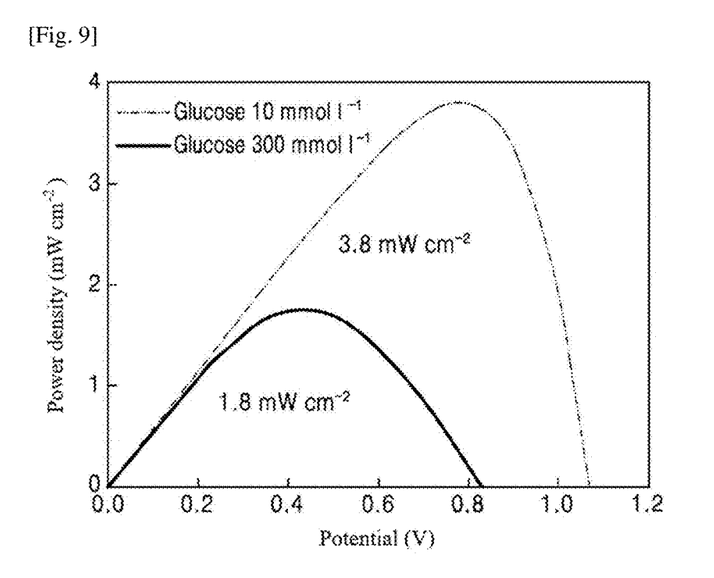
FIG. 9 shows the power densities of a biofuel cell fabricated in Example 3.

FIG. 9 shows the power densities of the biofuel cell. The power densities of the biofuel cell were measured at different glucose concentrations of 10 and 300 mmol l$^{-1}$. The red curve shows the power generation efficiency obtained using the higher concentration of glucose electrolyte and the blue curve shows the power generation efficiency obtained at a concentration similar to the glucose concentration in the body fluid considering the fact that the biofuel cell is implanted. As a result, the inventive biofuel cell was found to have higher power generation efficiency than biofuel cells reported to date. This is because the affinity between the surface of the cotton fiber and the metal nanoparticles coated on the cotton fiber can be maintained at a high level due to the hydrophilicity of the cotton fiber, enabling effective coating of a large amount of the metal nanoparticles on the surface of the cotton fiber. That is, the absolute amount of the metal nanoparticles per unit area of the electrode increases, resulting in effective electron transfer in the electrode. In addition, the internal micropores of the cotton fiber serve as passages for electron and mass transfer, facilitating the transfer of glucose or oxygen and electrons.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention.

Such simple modifications and improvements of the present invention belong to the scope of the present invention, and the specific scope of the present invention will be clearly defined by the appended claims.

INDUSTRIAL APPLICABILITY

The electrode of the present invention is manufactured by coating metal nanoparticles on an electrically non-conductive substrate based on layer-by-layer self-assembly. The electrode of the present invention can be applied to a cathode and an anode to fabricate a biofuel cell with improved power generation efficiency. Therefore, the present invention is considered industrially applicable.

The invention claimed is:

1. A cathode comprising:
    an electrically non-conductive substrate;
    a base layer not comprising an enzyme and disposed on an outer surface of the substrate;
    a nanoparticle layer comprising metal nanoparticles and disposed on an outer surface of the base layer; and
    a monomolecular layer comprising a first monomolecular material having one or more amine groups and disposed on an outer surface of the nanoparticle layer.

2. The cathode according to claim 1, wherein the substrate is a cotton fiber.

3. The cathode according to claim 1, wherein the base layer is composed of polyethylenimine (PEI).

4. The cathode according to claim 1, wherein the metal nanoparticles are nanoparticles of at least one metal selected from the group consisting of gold, silver, aluminum, copper, and platinum.

5. The cathode according to claim 1, wherein the first monomolecular material is tris(2-aminoehylamine) (TREN).

6. The cathode according to claim 1, wherein the cathode comprises a plurality of nanocomposite thin films, each of which has a bilayer structure in which the monomolecular layer is formed on the nanoparticle layer.

7. A biofuel cell comprising:
    the cathode according to claim 1; and
    an anode comprising the cathode according to claim 1, an enzyme layer comprising an enzyme and disposed on an outer surface of the monomolecular layer of the cathode, and a linker layer comprising a second monomolecular material having one or more amine groups and disposed on the outer surface of the enzyme layer.

8. The biofuel cell according to claim 7, wherein the enzyme is selected from the group consisting of glucose oxidase, D-fructose dehydrogenase, and a mixture thereof.

9. The biofuel cell according to claim 7, wherein the second monomolecular material is tris(2-aminoehylamine) (TREN).

10. The biofuel cell according to claim 7, wherein the biofuel cell comprises a plurality of oxidation layers, each of which has a bilayer structure in which the linker layer is formed on the enzyme layer.

11. A method for manufacturing the cathode according to claim 1 comprising:
    (a) dipping an electrically non-conductive substrate in a solution of a polymer to form a base layer not comprising an enzyme on the outer surface of the substrate;
    (b) dipping the substrate, where the base layer is formed, in a solution of metal nanoparticles to form a nanoparticle layer on the outer surface of the base layer; and
    (c) dipping the substrate, where the nanoparticle layer is formed, in a solution of a first monomolecular material having one or more amine groups to form a monomolecular layer on the outer surface of the nanoparticle layer,
    wherein a nanocomposite thin film having a bilayer structure consisting of the nanoparticle layer and the monomolecular layer is formed on the outer surface of the substrate.

12. The method according to claim 11, wherein steps (b) and (c) are repeated sequentially such that a plurality of nanocomposite thin films are formed on the base layer and each of the nanocomposite thin films has a bilayer structure in which the monomolecular layer is formed on the nanoparticle layer.

13. A method for fabricating a biofuel cell comprising:
(a) manufacturing the cathode according to claim 11; and
(b) manufacturing an anode,
wherein the manufacturing the anode comprises:
(c) dipping the cathode in a solution of an enzyme to form an enzyme layer without redox electron carriers on an outer surface of the monomolecular layer of the cathode; and
(d) dipping the cathode, where the enzyme layer is formed, in a solution of a second monomolecular material having one or more amine groups to form a linker layer on an outer surface of the enzyme layer.

14. The method according to claim 13, wherein steps (c) and (d) are repeated sequentially such that a plurality of oxidation layers are formed and each of the oxidation layers has a bilayer structure in which the linker layer is formed on the enzyme layer.

* * * * *